2,894,712
Patented July 14, 1959

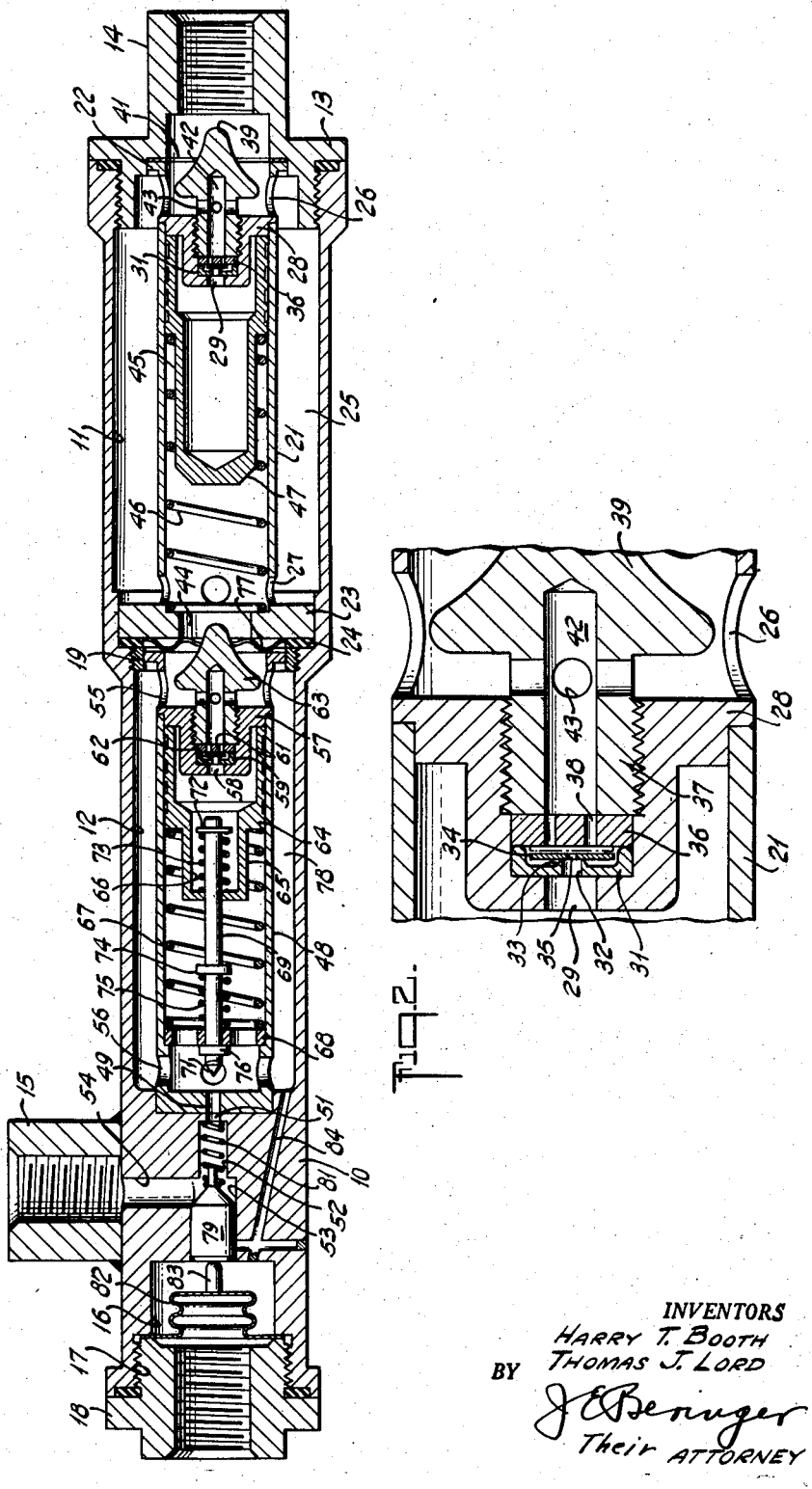

2,894,712

REPEATED ACTION INJECTOR DEVICE

Harry T. Booth, Dayton, and Thomas J. Lord, Middletown, Ohio, assignors to United Aircraft Products, Inc., Dayton, Ohio, a corporation of Ohio Application April 16, 1956, Serial No. 578,461

6 Claims. (Cl 251—13)

This invention relates to repeated action injector devices, especially as used in fuel systems to inject repeated quantities of fuel into a burner until ignition occurs.

An object of the invention is to provide a device of the kind described characterized by a mechanical construction obviating the use of electrical switches and contacting apparatus.

Another object of the invention is to provide an injector device as described of a simplified quick acting construction.

A further object of the invention is to embody in the injector device means automatically to discontinue operation of the device after a predetermined number of injections of fuel, or other fluid have taken place.

A still further object of the invention is to provide for automatic interruption of the operation of the injector device, whether or not the predetermined number of cycles has taken place, in response to a selected outside occurrence such as ignition.

Still another object of the invention is to embody in a single unitary construction, an injector device effecting repeated fuel injections or the like together with means automatically limiting the number of injections that can take place without ignition.

In the drawings,

Fig. 1 is a view in longitudinal section through an injector device in accordance with the illustrated embodiment of the invention; and Fig. 2 is a detail view, enlarged with respect to Fig. 1, of a portion of the injector device.

Referring to the drawings, an injector device in accordance with the illustrated embodiment of the invention comprises a unitary housing adapted to be interposed in a line flowing fluid under pressure, as for example, in the fuel inlet line to the after burner in a jet engine. In this system, it is desired to inject a predetermined quantity of fuel into the after burner chamber at regular intervals until ignition occurs and then to discontinue the injection action, all to be done automatically after initiation of the action by the operator.

As shown, in its illustrated form the device comprises an elongated body 10 which over the major part of its length is formed with longitudinally extending bores and counterbores including principally, aligned longitudinally spaced bores 11 and 12. The bore 11 opens at its one end through one end of the body 10 and is closed by an end plate 13 having an open projecting boss internally threaded for installation of the device at its one end in a line flowing fluid under pressure.

Secured to the body 10 near its other end is a boss 15 internally threaded for installation in the same said fluid flowing line, the boss 14 defining the inlet end of the device and the boss 15 the outlet end. The described other end of the body 10 is formed with a bore 16 and a counterbore 17, the latter of which is internally threaded to receive a tubular fitting 18 internally threaded for attachment of a pipe or conductor leading from a source of created pressure, as will hereinafter more clearly appear.

The chambers 11 and 12 are separated by an annular rib 19 in the body 10, which may, as shown, take the form of a ring screw threaded into position. Longitudinally disposed within the bore 11 is a cylinder 21 on one end of which is a flange 22 seated in a counterbore in the closure member 13. The opposite end of the cylinder 21 suitably abuts or is received in a spacer member 23 pressed against a seal 24 seated in the bottom of bore 11 against the internal rib 19. The cylinder 21 is open at its opposite ends and is spaced from the internal wall of the body 10 in a manner to define an annular surrounding chamber 25. At its one end, the chamber 25 communicates with the interior of the cylinder 21 through relatively large openings 26 therein. At its opposite end, the chamber 25 communicates with the interior of the cylinder 21 through relatively restricted openings 27 therein. Stationarily seated within the cylinder 21, immediately beyond the set of openings 26, is a cupped bushing 28 having an axial opening 29 therein for fluid flow into the interior of the cylinder. A plate 31 is received in the bushing 28 in a position to close opening 29 and has a relatively smaller opening 32 therein axially aligned with the opening 29. A relatively elevated seat 33 on the plate 31 surrounds the opening 32 and faces inwardly within the bushing. Adapted to engage the seat 33 is a disc 34 formed with a central orifice 35. A spacer member 36 is interposed between the plate 31 and an insert member 37 which has a threaded mounting in the bushing 28 in a manner to hold the spacer 36 against the outturned ends of the plate 31, the construction and arrangement of parts being such that the disc 34 is permitted limited axial motion between a position of rest on the seat 33 and a position of contact with one face of the spacer 36. In the former position, flow into the cylinder accurately is metered by the orifice 35. In the latter position, reverse flow is permitted relatively freely through the opening 32 and through openings 38 in the spacer 36, which latter openings are provided in such number and size as to enable flow in bypassing relation to the disc 34.

The insert member 37 has a tapered nose portion 39 extending through the adjacent open end of the cylinder 21 and partly through a washer 41 clamped between the cylinder 21 and the end closure 13 of such open construction as to permit a free flow of fluid therethrough. Further, insert member 39 is formed with a central bore 42 open at its one end to encompass and communicate with the openings 38 in the spacer 36. A set of radial ports 43 communicate the bore 42 with the interior of the cylinder 21 in advance of the bushing 28.

At its opposite end, the cylinder 21 encompasses and communicates with an axial opening 44 in the spacer member 23. Flow entering the device by way of boss 14 thus is divided as it enters the cylinder 21. The major part thereof passes through the openings 26 into the annular chamber 25 and flows longitudinally of the cylinder to the opposite end thereof where it reenters the cylinder by way of openings 27 and passes out of the bore 11 and into the bore 12 by way of opening 44. A smaller part of the flow enters insert member 39 by way of ports 43 and flows through bore 42, openings 38, orifice 35 and openings 32 and 29 to the interior of the cylinder 21 beyond the bushing 28. The fluid so admitted to the cylinder 21 acts to extend a piston 45 therein tending to move it inwardly or toward the opposite end of the cylinder. A spring 46 is seated on the spacer member 23 and is compressed by extending motion of the piston so that when application of an extending pressure to the piston is discontinued, the spring is effective to return the piston rearwardly substantially to the position shown in the drawings which is its normal, non-operating position. In response to flow through the annular chamber 25, as described, since the area of this chamber is larger than the total area of the openings 27, a pressure difference is established on opposite sides of the bushing 28, the greater pressure being applied through the opening 29 in the bushing upon the right-hand or outer end of the piston 45. The inner or opposite end of the piston is exposed to the lesser pressure. The pressure difference so derived and so applied is utilized as a force to effect motion of the piston 45 inward in the cylinder 21 against the resistance of spring 46. The pressure difference obtained is related to the rate of flow through the passage 25 and will be of sufficient magnitude to overcome the spring 46. The piston 45 will move inward in the cylinder 21 at a rate determined by the rate of flow through the opening 29, which in turn is a function of the orifice disc 34. This may roughly be calculated to be determined by the area of the orifice 35 multiplied by the amount of the pressure difference set up by the openings 27. The arrangement is such as to produce a constant ratio between the movement of the piston 45 and the rate of flow through passage 25 whereby for any given travel of the piston a constant predetermined volume of fluid will have passed through the passage 25 and out of the bore 11. The piston 45 begins to move immediately that flow into the device begins and continues to move until a tapered shoulder 47 on the inner end thereof engages the edge of opening 44 in spacer member 23. The spacer member 23 thus may be said to serve as a seat for the piston, the piston in turn functioning as a valve to shut off flow through the device as it engages the spacer 23.

On the return stroke of the piston 45, occurring after the supply of pressure fluid to inlet 14 has been discontinued, the fluid admitted to the cylinder 21 for extension of the piston is permitted to leave the cylinder by way of bushing opening 29 and communicating ports. It will be understood that the displaced fluid may flow back into the cylinder 21, by way of openings 26, passage 25 and openings 27, filling the space occupied by the piston in its extended position.

Within the bore 12 there is disposed a cylinder 48 seated at one end in the body 10 at the bottom of the bore 12 and having a bearing at its opposite end in the annular rib 19. The cylinder 48 is substantially the same in construction as the cylinder 21 except that the inner or lefthand end thereof is closed except for a relatively small diameter opening 49. This opening registers with and communicates with an opening 51 in the body 10 in turn opening into a bore 52 and counterbore 53, from the latter of which extends a lateral passage 54 to the outlet boss 15. The cylinder 48 further has longitudinally spaced apart sets of radial openings 55 and 56 corresponding to the openings 26 and 27 of cylinder 21. Also, there is installed in the cylinder 48 a bushing 57 having an opening 58 and carrying parts 59, 61, 62 and 63 corresponding to like parts carried by the bushing 28. Within the cylinder 48 is a piston 64 operative in the same manner as the piston 45 but formed at its inner end with a closed cage portion 65 housing a spring 73. A return spring for the piston 64 is represented by a spring 67 bearing on the inner end of the piston and seated on a perforate plate 68 seated in a counterbore in the cylinder 48 immediately in advance of the openings 56. The plate 68 also provides a bearing for a rod 69 which at its one end extends into the cage portion 65 of the piston 64 and at its other end extends through and beyond the plate 68 and is formed with a tapered valve portion 71 aligned with and adapted to enter the opening 49 in the inner end of the cylinder. Within the piston 64, the rod 69 has a clip or flange 72 thereon between which and the bottom of the cage portion 65 is interposed a compression spring 73. Also, a collar 74 is located on the rod 69 in an intermediate position and there is interposed between this collar and the plate 68 a compression spring 75. The springs 75 and 73 are arranged both to urge the rod 69 outwardly or to the right as viewed in the drawing, motion of the rod in this direction being limited by a collar 76 on the leftwardly projecting portion thereof engageable with the plate 68.

The parts normally occupy the position shown. In response to flow through the device, fluid enters the bore 12 by way of the opening 44 and passes through a washer 77 into the cylinder 48 in advance of the bushing 57. The flow of the fluid then follows the same pattern described in connection with the flow in bore 11. Thus, a major part of the fluid passes by way of annular passage 78 around the cylinder to the openings 56 and thence by way of opening 49, 51, bores 52 and 53 and passage 54 to the outlet boss fitting 15 where it continues down stream of the device to a place of use. Another part of the fluid flow passes through the bushing 57 and acts on piston 64 to extend the piston against the resistance of spring 67. The piston 64 begins and continues its extending motion relatively to the rod 69 which is held against a following motion by the spring 75. As the piston 64 nears the end of its extending motion, however, the cage portion 65 thereof positively engages collar 74 and, as the piston completes its extending movement, the rod 69 is carried with the piston until the parts limit by engagement of the valve portion 71 in the opening 49. Seating of the valve 71 in opening 49 shuts off fluid flow through the device. Accordingly, the pressure fluid forces acting on piston 64 become balanced and the piston begins to retract under the urging of spring 67. The rod 69 tends to follow the retracting motion of the piston due to the urging of spring 75 but is prevented from doing so by an unbalance of fluid pressures acting thereon. Thus, due to the exposed outer or right-hand end of the rod the pressure forces acting on the rod are unbalanced, with the resultant force being exerted in a direction to maintain the valve seated and closed. This resultant force, according to the construction and arrangement of parts is superior to the expansion pressure of spring 75. The piston 64 accordingly retracts relatively to the rod 69, the valve 71 therefore remaining closed. As the piston 64 nears the end of its retracting motion, the cage portion 65 engages the springs 66 between the bottom thereof and collar 72 with the result that continued retracting motion serves to compress the spring. The expansive pressure of spring 73, when added to that of spring 75, is sufficient to overcome the described resultant fluid pressure and the rod 69 moves quickly, as with a snap action, outwardly to its illustrated position, opening port 49 in the process. If fluid under pressure continues to be supplied through the opening 44, the piston 64 immediately will begin a new extending stroke and the operations described above will be repeated. Repetitive extending and retracting motions of the piston 64, with accompanying opening and closing movements of the valve 71, will continue so long as fluid is supplied the bore 12. Predetermined constant quantities of fluid are in effect ejected from the device as the cycles of movement of the piston 64 continue.

It will be understood that the piston 64 and associated parts operate in the manner of a pulser, sending a predetermined quantity of fluid at predetermined intervals out of the device to a place of use, as the after burner of a jet engine. Similarly, the piston 45 and associated parts operate as a timer which limits the complete cycles or pulses of the piston 64 to a predetermined number. Thus, a predetermined selected ratio is established between the orifices admitting fluid to the cylinder 21 and to the cylinder 48 which enables the piston 64 to complete a selected number of cycles of operation while the piston 45 is completing a single extending motion. At the conclusion of the selected number of cycles of the piston 64, the piston 45 reaches engagement with the spacer plate 23 and shuts off further flow to the bore 12. The parts within bore 12 accordingly assume a stabilized, normal position as illustrated and further flow out of the device is prevented. In the operation of the system of which the device is a part, the supply of fluid to the device will be discontinued when a series of pulses is completed. The piston 45 will retract and the device may be put in operation again or not, as may be desired. In this connection, the device in its illustrated embodiment is intended for use in the ignition system of an after burner and if ignition does not take place within the selected number of cycles of the device then it may be undesirable to inject additional quantities of fuel into the after burner. Also, it is desirable, should ignition take place before the selected number of cycles has been completed, to interrupt injection of the fuel without awaiting timed action of the piston 45. For this purpose, there is installed in the counterbore 53 a piston valve 79 having a tapered nose adapted to enter bore 52 and so cut off communication of the outlet end of cylinder 48 with outlet fitting 15. A spring 81 holds the piston valve 79 normally in a retracted, ineffective position as indicated.

A force for axial motion of the piston 79 to a seated or closed position is provided by a bellows 82 clamped between the bottom of counterbore 17 and fitting 18 and carrying a pin 83 engaging the rear of piston valve 79. The fitting 18 is adapted to be connected, as before mentioned, with a created source of pressure. This pressure, when created, thus is effective through the bellow 82 axially to project pin 83 and move valve member 79 to a position closing bore 52. The pressure for expanding bellows 82 may be drawn from any suitable source, the connection being made for example to the turbine which develops pressure in response to ignition of the after burner. Upon closing of the piston valve 79 further flow to the after burner by way of the injector device will be cut off whether or not the device has completed its series of cycles which represent a complete operation thereof. In response to such cutting off of flow, the parts of the device restore themselves automatically to a starting position, as before described, so that on a succeeding operation the device will recommence a new series of cyclic operations. Means also are provided for insuring that the valve 79 remains in closed position so long as pressure fluid is supplied to the injector device. This means is in the form of a passage 84 communicating at its one end with the bore 12 in the injector device and at its other end with the counterbore 53 at a point near the lefthand end thereof. The passage 84 normally is closed by the piston valve element 79. As this element moves to closed position, however, it opens the passage 84 and pressure fluid is free to flow from the bore 12 to the rear of the piston element 79 where it is confined by bellows 82 against escape and acts on the piston valve element in a direction to hold it in closed position.

In the cycling movement of the piston 64 the fluid flowing in a reverse direction from the rear of the piston, on the return stroke of the piston, is free to pass through the bushing 57 and out ports 55 to chamber 56 and thence to the front of the piston by way of ports 56. Should it be desirable to suppress any hydraulic surges this action might have on the piston 45, a check valve or the like may be installed between the cylinders 21 and 48, as in the passage 44. Such valve would be arranged to deny reverse flow between the cylinders, that is from the cylinder 48 to the cylinder 21.

The ports 26 and 55 are described as though they were directly a part of the respective cylinders 21 and 48. While the cylinders may be so integrally formed, these ports and the cylindrical extensions of which they are a part, are for convenience made a part of the respective bushings 28 and 57 pressed into place in the outer end of the cylinders.

What is claimed is:

1. In a device of the kind described, a body providing a fluid flow passage, means creating a pressure drop in said passage, a piston reciprocable in said body, means for applying said pressure drop across said piston for movement thereof in one direction, a valve for closing off flow through said passage, yielding means tending to open said valve, said valve being movable by said piston to closed position at a predetermined point in the travel of said piston in said one direction, means creating an unbalance of fluid pressure forces acting on said valve in the closed position thereof in a direction to close said valve, yielding means compressed by movement of said piston in said one direction for returning said piston in the opposite direction upon closing of said valve, and yielding means compressed by movement of said piston in a return direction tending to open the valve, the sum of the yielding means tending to open said valve exceeding the pressure unbalance acting on said valve at a predetermined point in the return of the piston whereupon said valve opens with a snap action.

2. A device according to claim 1, characterized by other means for interrupting flow in said passage, said piston reciprocating alternately to open and close said valve in repeated cycles of operation until said other means is operated to interrupt flow in said passage.

3. In a device of the kind described, a body providing a fluid flow passage therethrough, fluid under pressure being supplied said passage, a valve movable alternately to open and close said passage to flow therethrough, a piston reciprocable in said body, means operable to close said valve at a predetermined point in the movement of the piston in one direction, means operable to open valve at a predetermined point in the movement of the piston in the opposite direction, means effecting regular reciprocating motions of said piston in response to the continuing supply of pressure fluid to said passage, means for discontinuing the supply of pressure fluid to said passage after a selected predetermined quantity of fluid has been passed through said passage by said valve, and pressure responsive means for interrupting flow through said passage irrespective of the quantity of fluid passed therethrough, said body providing a flow path from said passage opened by said pressure responsive means in moving to flow interrupting position and supplying said pressure responsive means with pressure fluid, so long as the said means for discontinuing the supply of a predetermined quantity of fluid remains open, to maintain said pressure responsive means in flow interrupting position.

4. In a device of the kind described, a housing to be interposed in a line flowing fluid under pressure and presenting an inlet and an outlet, a passage in said housing extending between said inlet and said outlet, a pair of pistons disposed in series relation in said housing for respective movements in extending and retracting directions, means creating a pressure drop in said passage, means utilizing said pressure drop to extend said pistons at respectively different rates, means for returning the piston of higher extension rate from extended position, the piston of slower extension rate completing a single extending movement following passage of a predetermined quantity of fluid through said passage which is a predetermined multiple of the quantity of fluid passing during each cycle of extending and retracting movements of the other piston, valves on said pistons closing said passage to fluid flow therethrough in an extended position of said pistons, and pressure responsive means for closing said passage to fluid flow therethrough, and a conduit from said passage supplying pressure fluid to said pressure responsive means to hold said pressure responsive means in closed position.

5. In a device of the kind described, a body providing a fluid flow passage, means creating a pressure drop in said passage, a piston reciprocable in said body, means for applying said pressure drop across said piston for movement thereof in one direction, a valve for closing off flow through said passage, said valve including an elongated stem longitudinally disposed in said body and having a valve portion on one end thereof, a first spring means based on said body and engaged with said valve to hold said valve retracted or in an open position, said piston including means engagable with said valve at a predetermined point in the travel of said piston in said one direction and actuating said valve to closed position in response to continued travel of said piston in said one direction, said valve stem providing for an unbalance of fluid pressures in the closed position of said valve of a value to hold said valve closed against the urging of said first spring means, a return motion of said piston being accomplished independently of said valve, means to return said piston in response to closing of said valve, and a second spring means between said valve and said piston compressed by return of said piston to add its pressure to that of said first spring means for opening of said valve at a predetermined point in the return of said piston.

6. A device according to claim 5, characterized in that said valve stem extends through and beyond a portion of said piston at the said opposite end thereof and said valve stem having radial collars thereon on opposite sides of said portion of said piston, said first spring means being interposed between one of said collars and said body and the second said spring means being interposed between the other of said collars and said piston, said other collar being located at the said opposite end of said valve stem.

References Cited in the file of this patent

UNITED STATES PATENTS

| | | |
|---|---|---|
| 2,512,190 | Waterman | June 20, 1950 |
| 2,580,433 | Kain | Jan. 1, 1952 |
| 2,592,487 | Stark | Apr. 8, 1952 |
| 2,695,766 | Peltz | Nov. 30, 1954 |